United States Patent [19]

McGrath, Jr.

[11] 4,212,478
[45] Jul. 15, 1980

[54] CARPET POLE CADDIE

[76] Inventor: Donald L. McGrath, Jr., 19 Ramsgate Dr., Palos Park, Ill. 60464

[21] Appl. No.: 956,393

[22] Filed: Oct. 31, 1978

[51] Int. Cl.² ............................................. B62B 11/00
[52] U.S. Cl. .............................. 280/79.1 A; 248/129; 414/607
[58] Field of Search ............ 280/79.1 A, 79.1 R, 280/79.2, 79.3, 43.12, 47.34; 414/910, 911, 607, 608; 248/519, 523, 129

[56] References Cited

U.S. PATENT DOCUMENTS

| | | | |
|---|---|---|---|
| 2,536,561 | 1/1951 | Mickam | 280/79.1 A |
| 2,575,749 | 11/1951 | Cross | 280/79.2 |
| 2,684,164 | 7/1954 | Violette | 414/607 |
| 3,705,658 | 12/1972 | Harris | 414/607 |
| 3,860,078 | 1/1975 | Stoick | 280/79.1 A |

FOREIGN PATENT DOCUMENTS 614572  6/1935  Fed. Rep. of Germany .......... 280/79.1

Primary Examiner—David M. Mitchell
Attorney, Agent, or Firm—Harry B. Keck

[57] ABSTRACT

A caddie is provided for a carpet pole when not in use, i.e., when not connected to a lift-truck. The carpet pole is supported above ground whereby it can be mounted on a lift-truck without requiring manual lifting; similarly the carpet pole may be demounted from a lift-truck without requiring manual lifting.

4 Claims, 6 Drawing Figures

CARPET POLE CADDIE

BACKGROUND OF THE INVENTION

1. Field of the Invention

This invention concerns a caddie for a carpet pole.

2. Description of the Prior Art

Carpet poles are employed as an attachment for a lift-truck to skewer, lift and transport rolls of carpeting, usually in a carpet warehouse. The carpet poles, provided in standard lengths of nine feet or twelve feet, are intended to be mounted on the forward mask of a lift-truck. Because of the weight of a standard carpet pole, two men are customarily employed to lift the pole for mounting and to lift the pole again for demounting.

In a typical floor-covering warehouse, a single lift-truck may be equipped with conventional lifting forks for some portions of a typical working shift. For other portions of the working shift, the lifting forks must be removed and replaced by a carpet pole for moving rolls of carpeting. This interchange may be repeated ten or more times during an eigth-hour working day. Each of the individual lifting forks can be easily mounted and demounted by one man. However two men are required to mount and to demount the carpet pole because of its weight. The demounted carpet pole frequently becomes an obstacle to movement through the passageway where it was placed, and may be a safety hazard.

SUMMARY OF THE INVENTION

The principal object of this invention is to provide a caddie for receiving a carpet pole when it is not mounted on the forward mask of a lift-truck. The caddie is positioned at a level above the ground which permits the carpet pole to be deposited upon the caddie directly from the lift-truck; and also permits the lift-truck to pick up the carpet pole from the caddie when required. One workman can move the caddie and carrpet pole if it is blocking a passageway.

DESCRIPTION OF THE PREFERRED EMBODIMENT(S)

Figure 1:
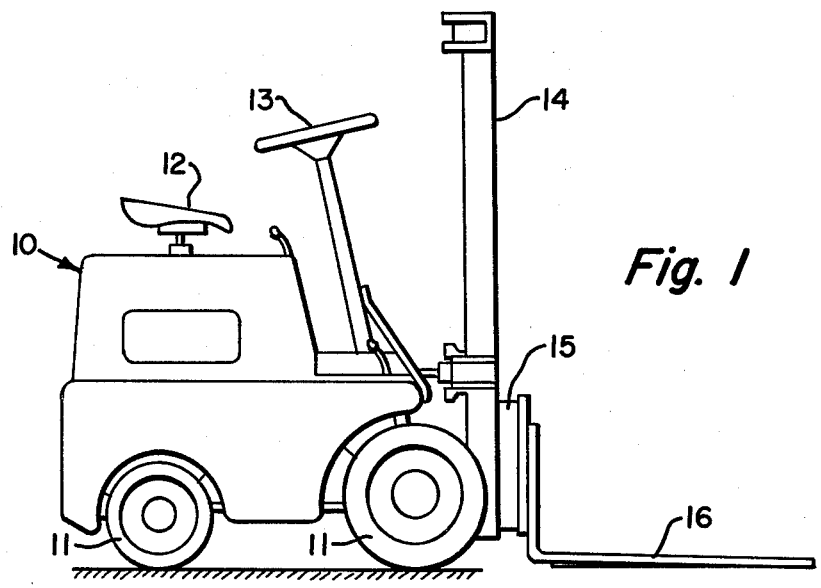
FIG. 1 is a side-elevation of a typical lift-truck having standard lifting forks mounted on the forward mask.
Figure 2:
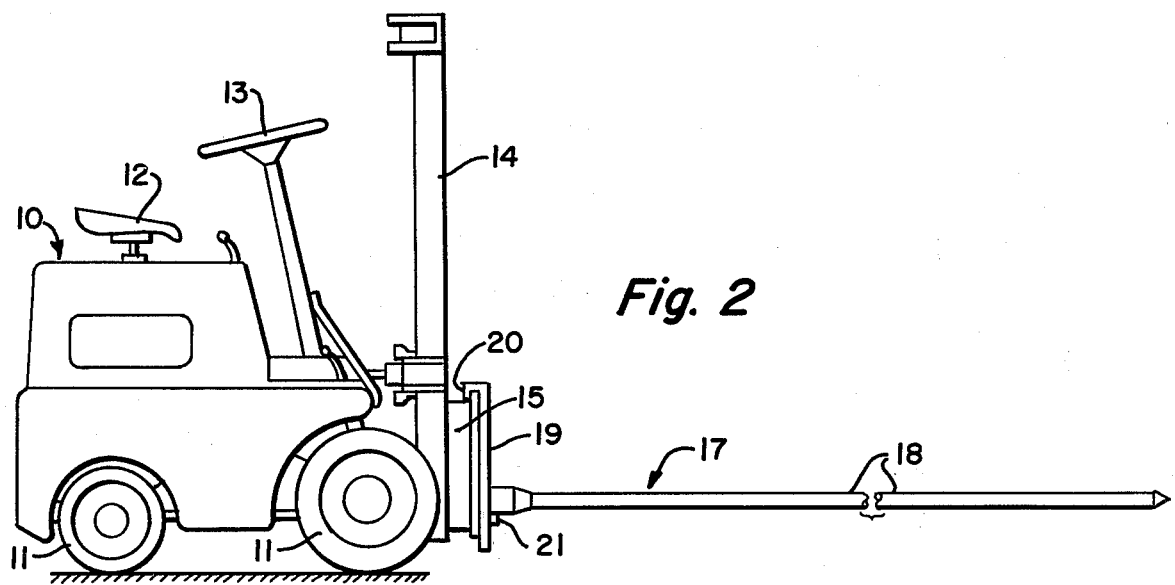
FIG. 2 is a side-elevation of the lift-truck of FIG. 1 having a carpet pole mounted on the forward mask.

A typical lift-truck 10, shown in FIGS. 1 and 2, includes wheels 11, an operator seat 12, steering wheel 13, lifting rails 14 (also called masts or elevator guides) and a forward mask 15 which can be raised or lowered on the lifting rails 14. In the familiar fork-lift embodiment of FIG. 1, two forks 16 are individually secured to the forward mask 15. When the forks 16 are removed, a carpet pole 17 can be mounted on the forward mask 15. The carpet pole 17 has a cylindrical rod portion 18 and a contiguous mounting plate 19. The rod portion 18 has a length of nine feet or twelve feet which corresponds to the width of customary carpeting rolls which are to be skewered, lifted and transported by the carpet pole/- lift-truck combination of FIG. 2. The rod portion 18 may be about three-inches in diameter. The carpet pole 17 also has a mounting plate 19, usually trapezoidal in shape. Mounting brackets 20 extend from the top of the mounting plate 19 to rest upon the top of the forward mask 15. A fastening bolt 21 is provided in aligned bolt-receiving openings in the mounting plate 19 and the forward mask 15 to prevent unintended separation of the mounting plate 19 from the forward mask 15.

Figure 3:
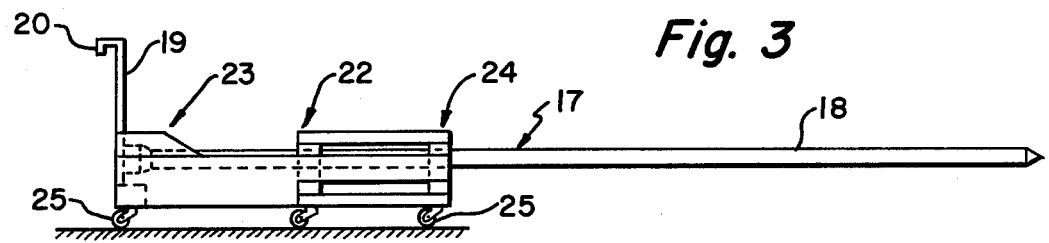
FIG. 3 is a side-elevation of the carpet pole caddie of this invention supporting a carpet pole.

In FIG. 3, the carpet pole 17 is shown resting upon a caddie 22 of this invention. The caddie 22 has a framework which includes a forward portion 23 which receives the mounting plate 19 and supports the mounting plate 19 above ground. The caddie 22 also has a rearward portion 24 which receives the rod portion 18 of the carpet pole 17.

The caddie 22 preferably is mounted on suitable rollers or casters 25 to permit the caddie 22 and carpet pole 17 to be easily moved toward and away from a lift-truck.

Figure 5:
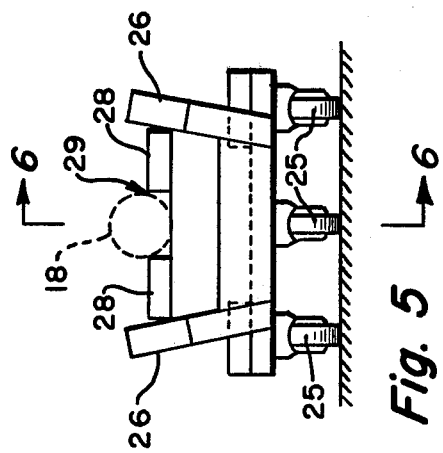
FIG. 5 is an end-view of the carpet pole caddie.

The framework of the caddie 22 preferably is fabricated from standard lumber which constitutes side rails 26 and cross members 27. The side rails 26 are sloped to conform to the trapezoidal shape of the mounting plate 19 thereby to minimize movement of the mounting plate 19 and to facilitate the registry of the carpet pole 17 within the carpet caddie 22. The rearward portion 24 has a pair of generally parallel rails 28 (for example, 2"×4" lumber) which define between them a lengthwise channel 29 for receiving the rod portion 18 of the carpet pole 17 as best seen in FIG. 5.

The length of the framework of the caddie 22 should be greater than the distance between the mounting plate 19 and the centroid of the carpet pole 17 so that the rod portion 18 will not touch the ground when the carpet pole 17 is positioned on the caddie 22.

By supporting the carpet pole 17 above ground level, the caddie 22 permits a lift-truck operator to mount and to demount a carpet pole 17 without requiring assistance from other workmen and without requiring any manual lifting efforts. To accomplish a mounting operation, the lifting forks 16 (FIG. 1) are manually removed from the forward mask 15. The lift-truck 10 is moved into confrontation with the caddie 22 containing a carpet pole 17, as in FIG. 3. Alternatively the lift-truck 10 may be stationary and the caddie 22, containing the carpet pole 17, may be moved into confrontation with the lift-truck 10. The forward mask 15 is moved to a bottom-most position on the lifting rails 14, in which bottom-most position the top edge of the forward mask 15 is beneath the mounting brackets 20. The operator then raises the forward mask 15 on the lifting rails 14 until the forward mask 15 engages the mounting brackets 20 and lifts the carpet pole 17 upwardly from the caddie 22. The fastening bolt 21 may then be inserted through aligned openings by the operator. In this condition, the lift-truck appears as in FIG. 2, i.e., in condition to skewer, lift and transport rolls of carpeting.

Figure 4:
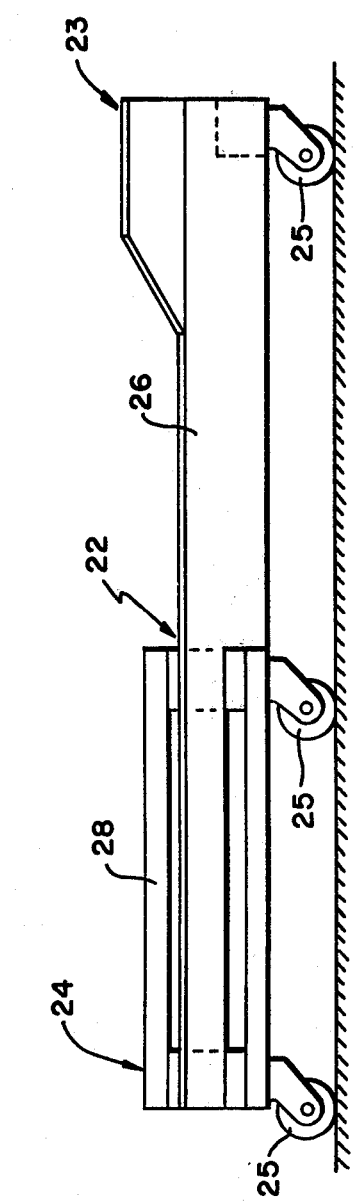
FIG. 4 is an enlarged side-elevation of the carpet pole caddie of FIG. 3 without a carpet pole.
Figure 6:
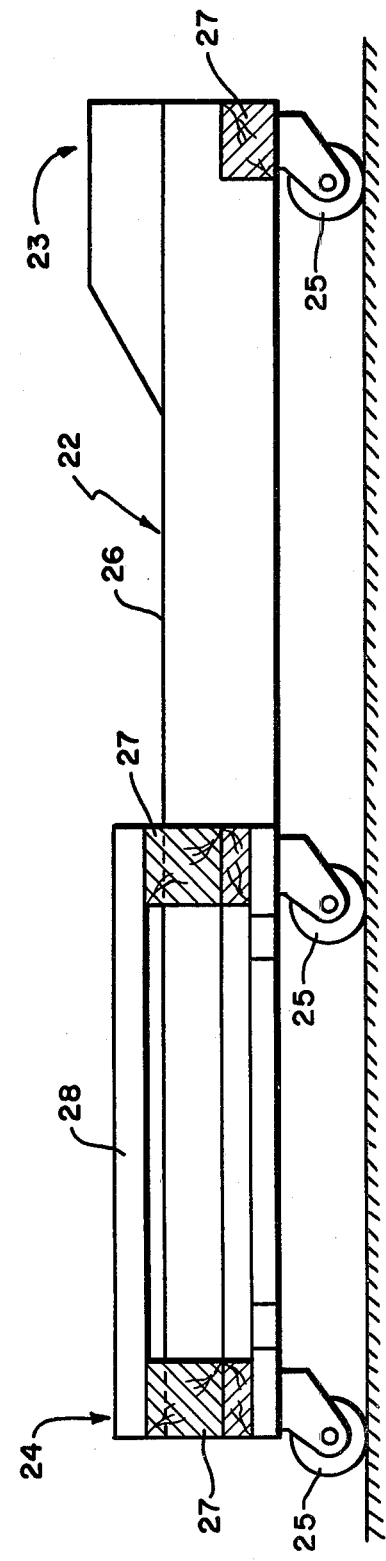
FIG. 6 is a section view taken along the line 6—6 of FIG. 5.

The carpet pole demounting operation also can be carried out by the operator without requiring assistance or requiring any manual lifting. The empty caddie 22 (FIG. 4) is brought into confrontation with with the lift-truck 10 and positioned with the channel 29 beneath the rod portion 18. The operator then removes the fastening bolt 21 and lowers the forward mask to its bottom-most position of the lifting rails 14. Prior to reaching the bottom-most position, the forward mask 15 separates from the mounting brackets 20 and mounting plate 19 settles onto the caddie 22. Thereupon the operator steers the lift-truck 10 away from the caddie 22; alternatively the caddie 22 and the retained carpet pole 17 can be moved away from the lift-truck 10 to an inactive location.

The caddie 22 permits mounting and demounting of the carpet pole 17 without requiring manual lifting because the forward portion 23 supports the mounting plate 19 at a level above the level which the mounting plate 19 assumes when engaged with the forward mask 15 in its bottom-most position on the lifting rails 14.

I claim:

1. A caddie for a carpet pole which is adapted to be engaged by a forward mask of a lift-truck and which has a mounting plate and has a contiguous rod portion extending away from the mounting plate, said caddie comprising:

a framework having a forward portion, shaped to receive the said mounting plate; and a rearward portion having a rod-receiving channel for the said rod portion of the said carpet pole;

said forward portion supporting the said mounting plate at a level above a level which the mounting plate assumes when engaged with the said forward mask in the bottom-most position of the said forward mask.

2. The caddie of claim 1 wherein the said rod-receiving channel is formed by two generally parallel rails.

3. The caddie of claim 1 wherein the said framework is mounted on rollers or casters.

4. The caddie of claim 1 wherein the length of the said framework is greater than the distance between the said mounting plate and the centroid of the said carpet pole.

* * * * *